United States Patent Office 3,168,580
Patented Feb. 2, 1965

3,168,580
TRIS-HALOMETHYL TRIMETHYL BENZENES
Chester E. Adams, Highland, Ind., assignor to Standard Oil Company, Chicago, Ill., a corporation of Indiana
No Drawing. Filed Aug. 26, 1960, Ser. No. 52,034
5 Claims. (Cl. 260—651)

This application is a continuation-in-part of S.N. 642,974, filed February 28, 1957, now Patent No. 2,951,100.

This invention relates to halomethyl aromatic compounds. In a particular aspect, it relates to tris-halomethyl trimethyl benzenes as compositions of matter.

This invention provides tris-halomethyl trimethyl benzenes, i.e., $\alpha^x,\alpha^y,\alpha^z$-trihalohexamethyl benzenes wherein each of $x$, $y$ and $z$ is a different integer of 1 to 6 inclusive. These include, for example, the tris-chloromethyl trimethyl benzenes and the tris-bromomethyl trimethyl benzenes. More particularly, the tris-halomethyl trimethyl benzenes include tris-chloromethyl mesitylene ($\alpha^1,\alpha^3,\alpha^5$-trichlorohexamethyl benzene), tris-chloromethyl pseudocumene ($\alpha^1,\alpha^4,\alpha^5$-trichlorohexamethyl benzene), tris-chloromethyl hemimellitene ($\alpha^1,\alpha^2,\alpha^3$-trichlorohexamethyl benzene), tris-bromomethyl mesitylene, tris-bromomethyl pseudocumene, and tris-bromomethyl hemimellitene.

The compounds of this invention may conveniently be prepared by the method of Adams and Meyer as disclosed in copending S.N. 642,974. In accordance with that method, a trimethyl benzene may be halomethylated to form the corresponding tris-halomethyl trimethyl benzene by reacting the trimethyl benzene with formaldehyde or one of its polymeric forms such as paraformaldehyde or trioxymethylene in the presence of a stoichiometric excess of HCl or HBr under a pressure exceeding about 100 p.s.i. and preferably within the range of about 300 to 1500 p.s.i. A weak acid catalyst such as $ZnCl_2$ may be used if desired. The process is particularly valuable for the introduction of multiple halomethyl groups in forming the compounds of this invention.

The preparation of the compounds of this invention, for example with reference to the chloromethylation of the trimethyl benzenes, may, if desired, be carried out in accordance with the following reaction equations:

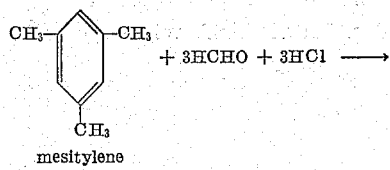
mesitylene

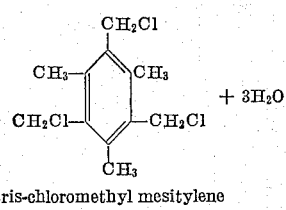
tris-chloromethyl mesitylene

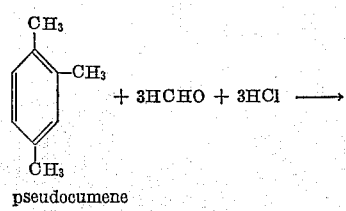
pseudocumene

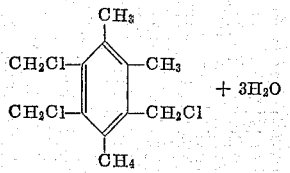
tris-chloromethyl pseudocumene

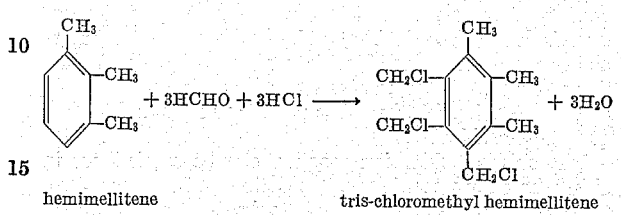
hemimellitene     tris-chloromethyl hemimellitene

The compounds of this invention may be prepared as above using a monohalomethyl or bis-halomethyl trimethyl benzene as a starting material in the preparation in lieu of the trimethyl benzene. The useable starting materials are, therefore, mesitylene, pseudocumene and hemimellitene and monohalomethyl or bis-halomethyl derivatives thereof. Any desired method for producing such halomethylated aromatic hydrocarbons for use as starting materials can be employed.

For convenience, the preparation of compounds of this invention will hereinafter be described with particular reference to chloromethylation of aromatic compounds, i.e., trimethyl benzenes or halomethylated derivatives thereof. It should be understood, however, that it is just as applicable to bromomethylation of these compounds, by the substitution of HBr for HCl whenever the latter is used.

Formaldehyde can be supplied to the reaction in aqueous solution (e.g., as formalin) or as a revertible polymer such as paraformaldehyde, trioxymethylene, trioxane, etc. In general, any polymeric form of formaldehyde which reverts to formaldehyde under the process conditions can be used.

The relative quantities of aromatic compound and formaldehyde which are used depend on the degree of chloromethylation which is desired, and on the nature of the aromatic compound. Usually in preparing the present compounds, a molar excess of formaldehyde to aromatic compound is used. Generally, molar ratios of formaldehyde to aromatic compound within the range from about 1:1 to about 10:1 are adequate, although in certain cases ratios of greater than 10:1 may be desirable.

In carrying out the reaction a stoichiometric excess of hydrogen chloride may be supplied to the reaction vessel under a pressure in excess of about 100 p.s.i. at the reaction temperature, and preferably within the range of about 300 to 1500 p.s.i. In general, pressures below about 100 p.s.i. result in poor yields of polychloromethylated products and pressures above about 2,000 p.s.i. offer no particular advantage. The range of pressure between about 300 p.s.i. and 1500 p.s.i., which is the preferred range for the operation of our process, is sufficient for the chloromethylation of most of the aromatic compounds contemplated for use in our invention, although at times it may be desirable to exceed this range.

Suitable temperatures for the above preparation range from about 0° C. to a maximum of about 125° C., above which decomposition of the product is likely to occur. In general, the higher temperatures should be used when the reaction is one which proceeds only with difficulty. However, since the use of elevated temperatures results in the formation of undesirable compounds such as diarylmethanes and condensation products, the temperature used should be as low as possible, consistent with the yields desired. In carrying out the reaction, temperature control can be improved if the formaldehyde is exposed to the HCl under pressure before the aromatic compound is added. The reaction between formaldehyde and HCl is exothermic and may produce a temperature surge which should be avoided if close temperature control over the reaction is to be maintained.

Suitable reaction times are likewise dependent on the particular starting aromatic compounds and the product which is desired. We have found that reaction periods of about 1 to 25 hours will yield good results in most cases.

While catalysts are not essential for preparation of compounds of my invention, the chloromethylation reaction is sometimes facilitated by the presence of acid-acting catalysts. Zinc chloride is particularly effective for this purpose. Other catalysts which can be used include aluminum chloride, bismuth chloride, zirconium chloride, and stannic chloride.

The chloromethylation reaction can be carried out in either batch or continuous operations. In either case, the reactants are charged to a suitable pressure vessel equipped with stirring or other means for obtaining intimate contact of the reactants and with means for temperature control. Temperature control can be improved by contacting the formaldehyde (or polymer thereof) with HCl under pressure in the absence of the aromatic compound. After the resulting temperature surge has subsided, the resultant reaction product (probably chloromethyl ether) is contacted with the aromatic compound in the main reaction vessel in the presence of HCl under pressure, whereupon the chloromethylation reaction takes place. After the reaction has reached the desired degree of completion, which can be determined by any suitable method such as chloride analysis of a sample of the product, the reaction products are discharged from the reactor and separated by suitable means, as by distillation, and unconverted or incompletely converted reactants are recycled.

Example 1

A 250 ml. "Hastelloy B" reaction vessel equipped with magnetic stirring means (Magne Dash) was charged with 54 grams (1.8 moles) of paraformaldehyde and was pressured to 350 p.s.i. with HCl at room temperature. After the resulting temperature surge had subsided, the reactor was depressured and 43.3 grams (0.36 mole) of mesitylene was added. The reactor was then charged to a pressure of 540 p.s.i. with HCl at room temperature and maintained at 20–25° C. for 22 hours. The reactor was then depressured and the product was dissolved in benzene, washed with water, dried over $K_2CO_3$ and distilled. Conversion of mesitylene was 42.5% to bis-chloromethyl mesitylene and 14% to tris-chloromethyl mesitylene.

Example 2

Following the procedure of Example 1, 21.7 grams (0.1 mole) of bis-chloromethyl mesitylene was reacted with 15 grams (0.5 mole) of paraformaldehyde and HCl at a pressure of 1400 p.s.i. for 18 hours at 105° C. Conversion of bis-chloromethyl mesitylene was 91% to tris-chloromethyl mesitylene.

Example 2 demonstrates the extremely high yields of tris-halomethyl trimethyl benzenes which can be obtained. In this run, bis-chloromethyl mesitylene, a product normally difficult to chloromethylate further, was converted to the tris-chloromethyl compound in 91% yield. Using conditions similar to those of Example 2, other bis-chloromethylated compounds, such as bis-chloromethyl pseudocumene, and hemimellitene, can be converted in good yields to the tris-chloromethyl derivatives, i.e., tris-chloromethyl pseudocumene and tris-chloromethyl hemimellitene. The corresponding tris-bromomethyl compounds can be prepared in the same manner by substituting HBr for the HCl.

The process of invention provides valuable reactive chemical intermediates which can be readily converted into chemical products with widely diverse properties and uses. For example, bis-chloromethyl aromatic compounds such as bis-chloromethyl durene can readily be converted to the dicarboxylic acid by hydrolysis followed by caustic oxidation. The resultant dicarboxylic acid can be used for the manufacture of alkyd resins or, after esterification with an alcohol such as isooctyl alcohol, as a plasticizer for resins such as polyvinyl chloride, cellulose acetate and the like. The present tris-halomethyl compounds, i.e., the tris-bromomethyl and tris-chloromethyl trimethyl benzenes are likewise intermediates in forming corresponding carboxylic acids having the same uses.

Although my invention has been described with reference to specific embodiments thereof, the same are given by way of illustration only. Modifications and variations will be apparent from my description to those skilled in the art.

Having described my invention, I claim:
1. Tris-halomethyl trimethyl benzene, wherein the halo is selected from the class consisting of bromo and chloro.
2. Tris-chloromethyl trimethyl benzene.
3. Tris-chloromethyl pseudocumene.
4. $\alpha^1$, $\alpha^3$, $\alpha^5$-trichlorohexamethyl benzene.
5. Tris-bromomethyl trimethyl benzene.

References Cited in the file of this patent

Nanta et al.: "Rec. Trav. Chim." vol. 55, p. 1000 (1936).